(12) United States Patent
Glugla

(10) Patent No.: US 11,203,988 B1
(45) Date of Patent: Dec. 21, 2021

(54) SYSTEM AND METHOD FOR OPERATING AN ENGINE SUPPLYING POWER TO A POWER TAKE OFF

(71) Applicant: Ford Global Technologies, LLC, Dearborn, MI (US)

(72) Inventor: Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/003,629

(22) Filed: Aug. 26, 2020

(51) Int. Cl.
| | | |
|---|---|---|
| *F02D 13/02* | (2006.01) | |
| *F02D 41/02* | (2006.01) | |
| *B60K 17/06* | (2006.01) | |
| *B60K 17/28* | (2006.01) | |
| *F02D 13/06* | (2006.01) | |
| *F02D 9/08* | (2006.01) | |
| *F02D 41/00* | (2006.01) | |

(52) U.S. Cl.
CPC .......... *F02D 13/0207* (2013.01); *B60K 17/06* (2013.01); *B60K 17/28* (2013.01); *F02D 9/08* (2013.01); *F02D 13/06* (2013.01); *F02D 41/0002* (2013.01); *F02D 41/0215* (2013.01)

(58) Field of Classification Search
CPC .. F02D 13/0207; F02D 13/06; F02D 13/0226; F02D 13/0246; F02D 41/0215; F02D 41/0002; F02D 41/0087; F02D 9/08; F02D 2013/0296; B60K 17/06; B60K 17/28
See application file for complete search history.

(56) References Cited

U.S. PATENT DOCUMENTS

| | | | |
|---|---|---|---|
| 7,869,929 B2 | 1/2011 | Sugihara | |
| 9,605,603 B2 | 3/2017 | Glugla et al. | |
| 2005/0178357 A1* | 8/2005 | Yui | F02D 41/0002 |
| | | | 123/339.16 |
| 2007/0006572 A1* | 1/2007 | Yu | F02D 41/021 |
| | | | 60/285 |
| 2007/0142152 A1* | 6/2007 | Holmes | F16H 3/728 |
| | | | 475/2 |
| 2014/0172270 A1* | 6/2014 | Lee | F02D 41/0087 |
| | | | 701/102 |
| 2016/0244064 A1* | 8/2016 | Teraya | F02D 13/0226 |
| 2017/0145927 A1 | 5/2017 | Bucknell et al. | |
| 2017/0159558 A1* | 6/2017 | Kim | F02N 11/0851 |
| 2017/0370319 A1* | 12/2017 | Homant | F02D 41/083 |

* cited by examiner

*Primary Examiner* — George C Jin
(74) *Attorney, Agent, or Firm* — Geoffrey Brumbaugh McCoy Russell LLP

(57) ABSTRACT

Methods and systems for operating an engine that is coupled to a transmission that includes a power take off output are presented. In one non-limiting example, the engine may be operated in a speed control mode and a user may request smoother engine operation or more efficient engine operation via a human/machine interface. The more efficient engine operation may include operating the engine with fewer activated cylinders as compared to operating the engine for smoother engine operation.

17 Claims, 6 Drawing Sheets

SYSTEM AND METHOD FOR OPERATING AN ENGINE SUPPLYING POWER TO A POWER TAKE OFF

BACKGROUND/SUMMARY

A vehicle may include a power take off (PTO) output to provide engine power to devices that are external to a vehicle's powertrain. For example, power from the PTO may be supplied to a log splitter, hydraulic pump, generator, or other device that is external to the vehicle. In addition, in some examples, the PTO may supply power to devices that are part of the vehicle. For example, the PTO may supply power to a hydraulic pump that provides oil to a bed lift cylinder. The PTO may be activated when the vehicle is stationary and not moving. In some examples, the devices powered by the PTO may be driven at a constant speed. Further, the devices that are driven by the PTO may not be rated for the amount of power that may be delivered by the vehicle's engine. Therefore, the vehicle's engine may be operated at part load and with limited output power so that the device that is driven via the PTO may not be over driven. However, operating the engine at part load may reduce engine efficiency. Therefore, it may be desirable to provide a way of improving engine efficiency while providing power to a PTO.

The inventor herein has recognized the above-mentioned issues and has developed a vehicle system, comprising: an engine including a variable poppet valve lift system; a transmission coupled to the engine, the transmission including a power take off (PTO) configured to supply power to an off board device; a controller including executable instructions stored in non-transitory memory that cause the controller to operate the engine with a first poppet valve lift amount at an engine speed and load when the PTO is not delivering power to an external device, and operate the engine with a second poppet valve lift amount at the engine speed and load when the PTO is delivering power to the external device.

By adjusting an intake valve lift amount and engine throttle position, it may be possible to provide the technical result of improving engine efficiency while delivering engine power to an external device via a PTO. In particular, the engine may be operated with a higher intake manifold pressure so that engine pumping losses may be reduced. Further, the actual total number of active cylinders (e.g., cylinders in which fuel is being combusted) of the engine may be adjusted so that engine efficiency may be improved. In some examples, the valve lift and actual number of active cylinders may be adjusted while the vehicle is in a stationary PTO mode where engine noise and vibration may be less noticeable to vehicle occupants and where driveline torque disturbances due to load changes applied to the engine may be less noticeable to vehicle occupants.

The present description may provide several advantages. In particular, the approach may improve engine efficiency when the engine is supplying power to a PTO. Further, the approach may reduce spark plug fouling and lower engine emissions. Additionally, the approach may be provided without additional system hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
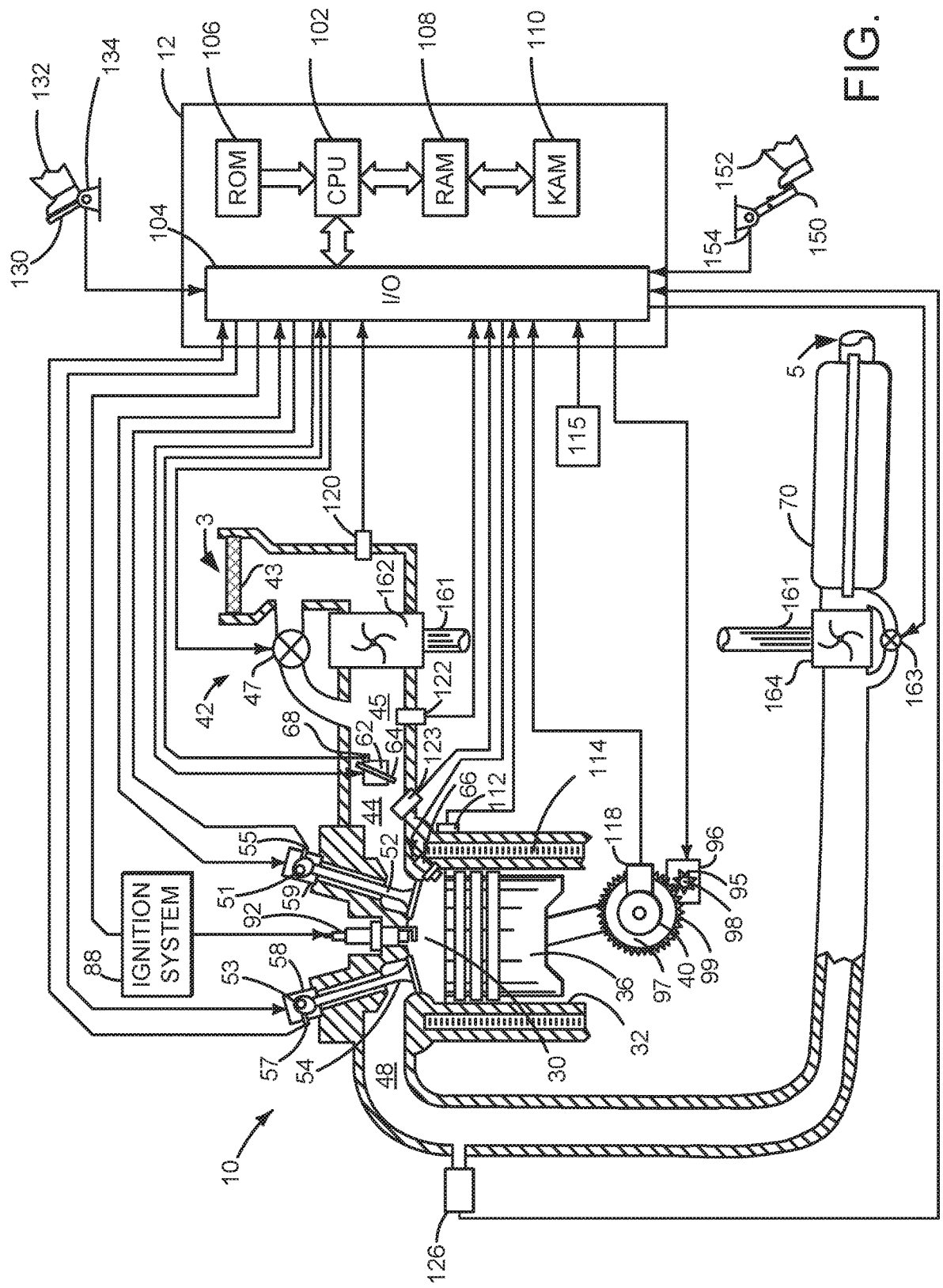
FIG. 1 shows a schematic depiction of an engine.
Figure 2:
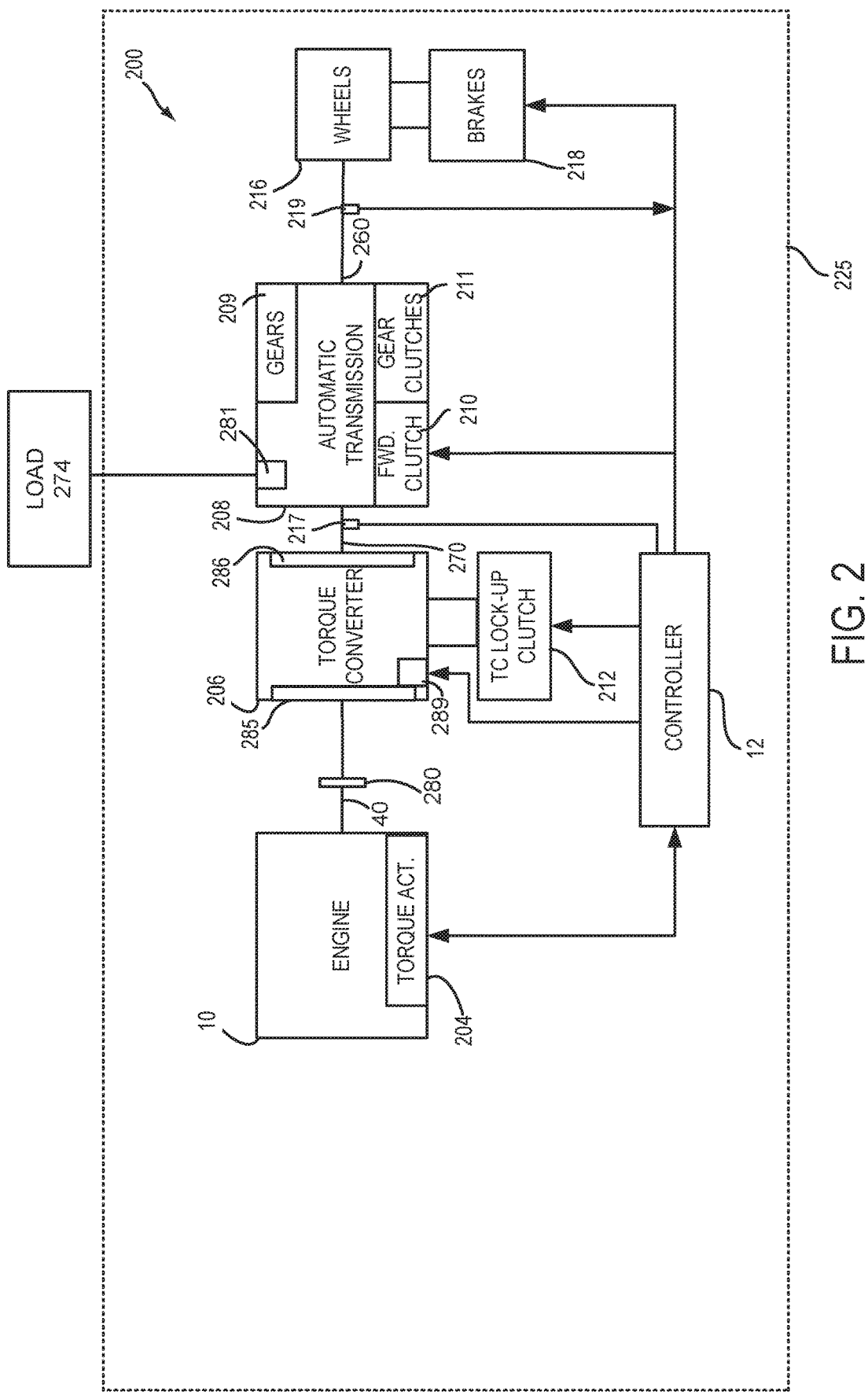
FIG. 2 shows a schematic depiction of an example vehicle powertrain including an engine.
Figure 3:
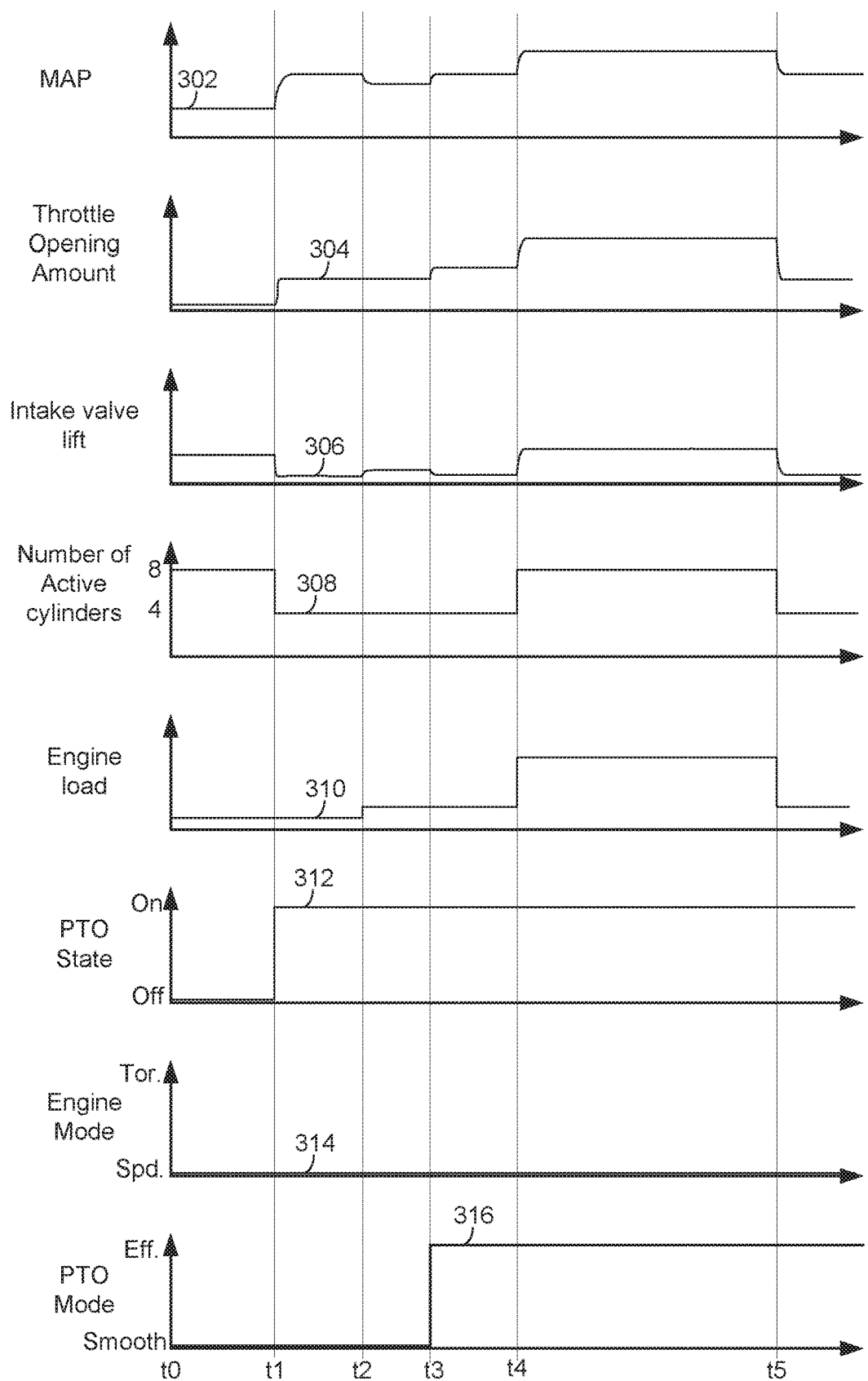
FIG. 3 shows an example engine operating sequence while engine power is delivered to a device via a PTO.

The present description is related to operating a vehicle powertrain that includes an engine that is coupled to a transmission that includes a power take off output. The power take off output may supply engine power to an external device (e.g., an engine torque consumer) that does not supply positive torque to the transmission. The external device may be included in or apart from the vehicle in which the engine operates. The engine may be configured as is shown in FIG. 1. The engine of FIG. 1 may be incorporated into a vehicle powertrain as shown in FIG. 2, and the engine may be the only adjustable torque source in the powertrain as is shown in FIG. 2. The engine may be operated as shown in the sequence of FIG. 3. The engine may be operated according to the method shown in FIGS. 4A-4C.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Lift and phase of intake valve 52 may be selectively activated and deactivated by valve activation device or system 59. Lift and phase of exhaust valve 54 may be selectively activated and deactivated by valve activation device or system 58. The variable valve lift devices or systems may be of the types described in U.S. Pat. Nos. 7,869,929, 9,605,603, which are hereby fully incorporated by reference for all purposes, or other known valve lift systems or mechanisms. One or more cylinders may be deactivated via providing zero intake and/or exhaust valve lift for one or more cylinder cycles while fuel delivery to the deactivated cylinders is suspended.

The valve activation devices 58 and 59 may be mechanical, electro-mechanical, or electrically controlled.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine beyond the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle occupants, users, and operators 152 may request data and input data to controller 12 via human/machine interface 115. For example, users may input PTO mode requests via human/machine interface 115.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsion pedal 130 for sensing force applied by operator 132; a position sensor 154 coupled to brake pedal 150 for sensing force applied by operator 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed.

Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of a vehicle 225 including a powertrain 200 is shown. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to dampener 280, and dampener 280 is shown coupled to impeller 285 of torque converter 206. Torque converter impeller 285 is mechanically coupled to transmission pump 289. Transmission pump 289, which is mechanically driven, supplies pressurized transmission fluid to transmission clutches 210 and 211. Torque converter 206 also includes a turbine 286 coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked. TCC is electrically operated by controller 12.

Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly transferred to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 also includes a power take off output shaft 281 for supplying engine torque to a mechanical or electrical load 274 external to the powertrain. Power take off output shaft 281 rotates when activated and does not rotate when deactivated. In this example, load 274 is external to the vehicle 225, but in other examples, load 274 may be included in vehicle 225. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Power take off output shaft 281 may supply engine torque to load 274 when transmission 208 is neutral. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the operator pressing their foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the operator releasing their foot from a brake pedal. Further, vehicle brakes may apply a frictional force to wheels 216 via controller 12 as part of an automated engine stopping procedure.

Thus, in this example, engine 10 is the only adjustable torque source that may provide positive torque to powertrain 200. Torque flows from engine 10 to transmission 208 before being applied to wheels 216. Thus, engine 10 is upstream of torque converter 206, transmission 208, and wheels 216 in a direction of torque flow.

Controller 12 may be configured to receive inputs from engine 10, as shown in more detail in FIG. 1, and accordingly control a torque output of the engine and/or operation of the torque converter, transmission, clutches, and/or brakes. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Thus, the system of FIGS. 1 and 2 provides for a vehicle system, comprising: an engine including a variable poppet valve lift system; a transmission coupled to the engine, the transmission including a power take off (PTO) configured to supply power to an off board device; a controller including executable instructions stored in non-transitory memory that cause the controller to operate the engine with a first poppet valve lift amount at an engine speed and load when the PTO is not delivering power to an external device, and operate the engine with a second poppet valve lift amount at the engine speed and load when the PTO is delivering power to the external device. The vehicle system includes where the second poppet valve lift amount is less than the first poppet valve lift amount.

In some examples, the vehicle system further comprises additional executable instructions to adjust a position of a throttle valve. The vehicle system includes where adjusting the position of the throttle valve includes opening the throttle valve further when the engine is operating with the second poppet valve lift amount as compared to a position of the throttle valve when the engine is operating with the first poppet valve lift amount. The vehicle system further comprises deactivating one or more cylinders while the PTO is delivering power to the external device. The vehicle system includes where deactivating one or more cylinders includes holding at least intake valves or exhaust valves of the one or more cylinders closed for at least one engine cycle. The vehicle system further comprises additional executable instructions for interpreting a user input for selecting between a smooth PTO mode and an efficient PTO mode. The vehicle system includes where the engine is operated at a higher intake manifold pressure in the efficient PTO as compared to when the engine is operated in the smooth PTO mode.

Figure 4A:
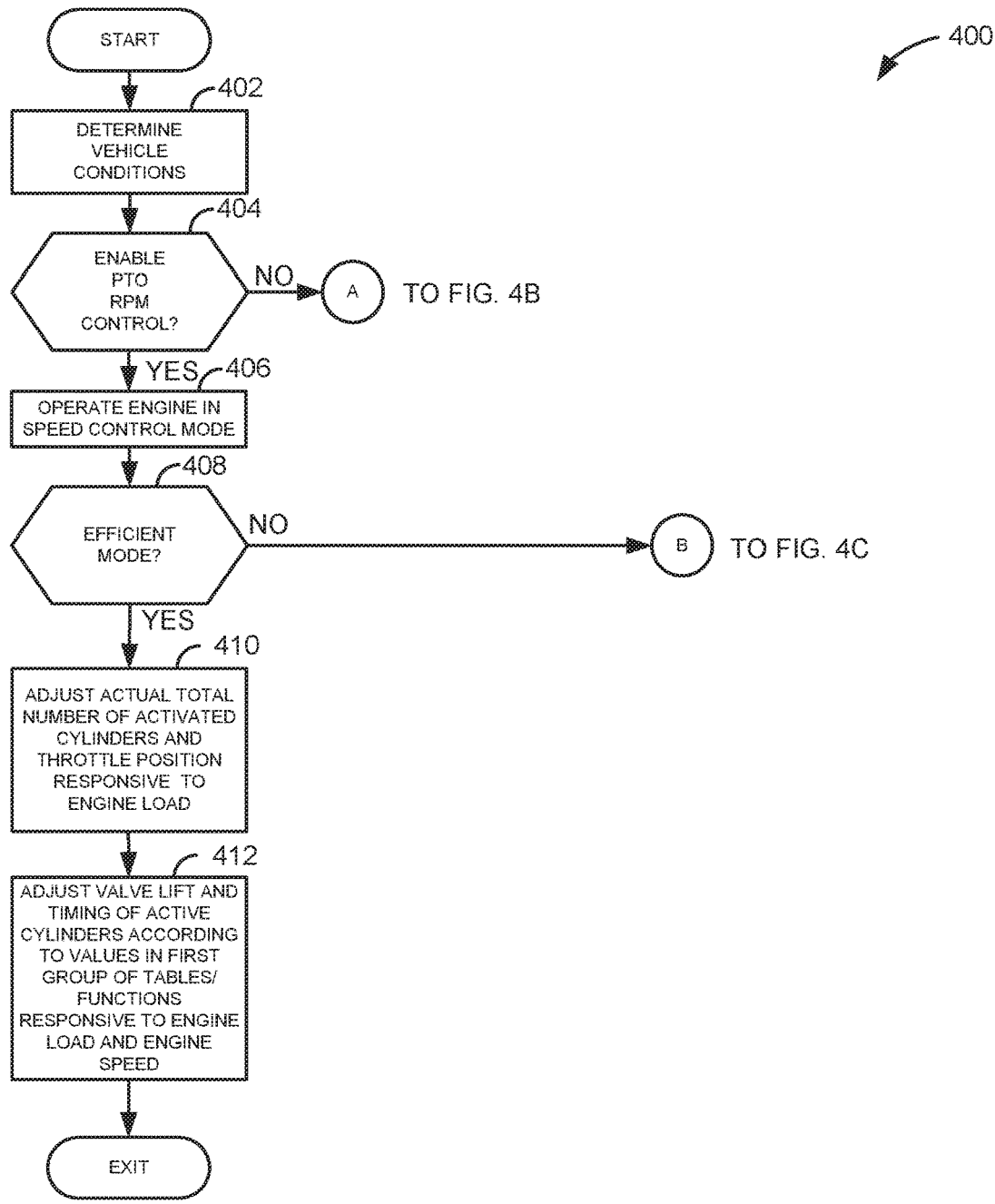
FIGS. 4A-4C show a flowchart of an example method for operating the engine while engine power is delivered to device via a PTO.
Figure 4B:
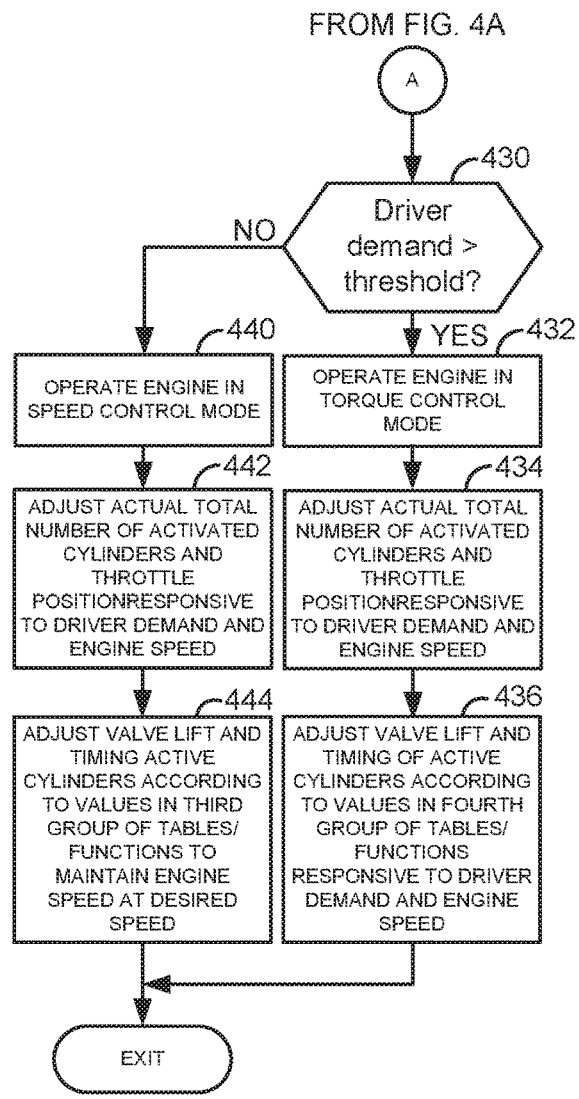
Figure 4C:
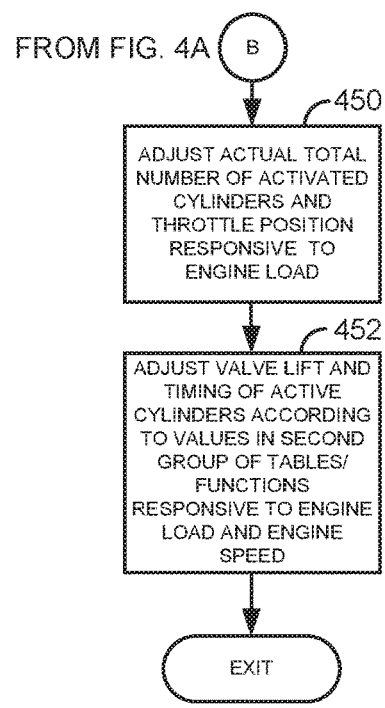

Referring now to FIG. 3, an example engine operating sequence according to the method of FIGS. 4A-4C is shown. The sequence of FIG. 3 may be provided via the system of FIGS. 1 and 2 in cooperation with and/or in conjunction with the method of FIGS. 4A-4C. The vertical lines at t0-t5 represent times of interest during the sequence. The plots are aligned in time. In this example, the engine is in a vehicle that has a transmission that is engaged in "park" or "neutral" during the sequence.

The first plot from the top of the figure is a plot of manifold absolute pressure (MAP) versus time. The vertical axis represents MAP and MAP increases in the direction of the vertical axis arrow. The horizontal line represents time and time increases from the left side of the plot to the right side of the plot. Trace 302 represents MAP.

The second plot from the top of the figure is a plot of a throttle opening amount versus time. The vertical axis represents a throttle opening amount and the throttle opening amount increases in the direction of the vertical axis arrow. The horizontal line represents time and time increases from the left side of the plot to the right side of the plot. Trace 304 represents throttle opening amount.

The third plot from the top of the figure is a plot of intake valve lift amount (e.g., a distance that an intake valve is moved from the intake valves fully closed position) versus time. The vertical axis represents intake valve lift amount and intake valve lift amount increases in the direction of the vertical axis arrow. The horizontal line represents time and time increases from the left side of the plot to the right side of the plot. Trace 306 represents intake valve lift.

The fourth plot from the top of the figure is a plot of an actual total number of active cylinders versus time. The vertical axis represents an actual total number of active cylinders and the actual total number of active cylinders increases in the direction of the vertical axis arrow. The horizontal line represents time and time increases from the left side of the plot to the right side of the plot. Trace 308 represents an actual total number of active cylinders.

The fifth plot from the top of the figure is a plot of engine load versus time. The vertical axis represents engine load and engine load increases in the direction of the vertical axis arrow. The horizontal line represents time and time increases from the left side of the plot to the right side of the plot. Trace 310 represents engine load.

The sixth plot from the top of the figure is a plot of PTO state versus time. The vertical axis represents PTO state and the PTO is delivering engine power to a load when trace 312 is at the level indicated as "On." The PTO is not delivering power to a load when trace 312 is at the level indicated as "Off." The horizontal line represents time and time increases from the left side of the plot to the right side of the plot. Trace 312 represents PTO state.

The seventh plot from the top of the figure is a plot of engine mode versus time. The vertical axis represents engine mode (e.g., where engine speed follows a desired or requested engine speed and engine torque varies so that engine speed follows the desired or requested engine speed) and engine mode is speed control mode when trace 314 is near the level of label "Spd." The engine is in torque control mode (e.g., where engine torque follows a desired or requested engine torque and engine speed varies so that engine torque follows the desired or requested engine torque) when trace 314 is near the level of label "Tor." The horizontal line represents time and time increases from the left side of the plot to the right side of the plot. Trace 314 represents engine mode.

The eighth plot from the top of the figure is a plot of PTO mode versus time. The vertical axis represents PTO mode and the PTO is operating in an efficiency mode when trace 316 is near the level of label "Eff." The PTO is operating in a smooth or lower noise and vibration mode when trace 316 is near the level of label "Smooth." The horizontal line represents time and time increases from the left side of the plot to the right side of the plot. Trace 316 represents the PTO mode.

At time t0, the engine is at idle speed (not shown) and the engine is being operated in a speed control mode. MAP is low to indicate that the engine is generating a higher level of vacuum. The throttle opening amount is small and the intake valve lift amount is at a lower middle level. The engine is operating with eight active cylinders and engine load is low. The PTO is not activated and the PTO mode is selected to be "smooth." Such conditions may be present when the engine is operating at idle conditions.

At time t1, the PTO is engaged and the actual total number of cylinders and the intake valve lift are adjusted in response to the PTO being engaged. The intake valve lift is reduced and the throttle opening amount is increased so that MAP may be increased to reduce engine pumping losses. Since the engine load is low, the actual total number of active cylinders is reduced from eight to four. This causes the charge (e.g. air and fuel) in the four active cylinders (not shown) to rise to meet the PTO load. The engine load is unchanged and the engine remains in speed control mode. The PTO remains in "smooth" mode.

At time t2, the load placed on the engine via the PTO increases and the intake valve lift is increased to meet the higher engine load. In this example, the throttle opening amount is not increased to meet the increased engine load, but in other examples the throttle opening amount may also be adjusted. The MAP value decreases a small amount since increasing the intake valve lift allows higher air flow into the active cylinders. The PTO remains engaged and the engine remains in speed control mode. The PTO remains in "smooth" mode.

At time t3, the operator switches the PTO mode from "smooth" to "efficient." The throttle is opened further and the intake valve lift is decreased in response to the PTO mode change. By increasing the throttle opening amount and decreasing the intake valve lift, engine pumping losses may be further reduced at the expense of increased engine noise and vibration. Consequently, engine fuel economy while operating the PTO may be increased. The MAP level increases while the engine load remains constant. The PTO remains engaged and the engine continues to operate in a speed control mode.

At time t4, the engine load increases in response to a reduction in engine speed (not shown) as additional load is applied to the PTO via the PTO load (not shown). The actual total number of active cylinders is increased so that engine output torque may be increased to compensate for the reduction in engine speed. In addition, the intake valve lift is increased so that engine torque output may be increased. The PTO continues to operate in "efficient" mode and the engine continues to operate in speed control mode.

At time t5, the engine load decreases in response to an increase in engine speed (not shown) as load is removed from the PTO via the PTO load (not shown). The actual total number of active cylinders is decreased so that engine output torque may be decreased while efficiently providing power to the PTO. The intake valve lift is decreased so that MAP may be maintained at a high level, thereby reducing engine pumping losses. The PTO continues to operate in "efficient" mode and the engine continues to operate in speed control mode.

In this way, an actual total number of active engine cylinders and intake valve lift may be adjusted to improve engine efficiency. In addition, intake valve lift and throttle position may be adjusted to improve engine efficiency responsive to selected PTO modes that allow operators to prioritize PTO efficiency and engine noise and vibration.

Referring now to FIGS. 4A-4C, a method for operating a vehicle powertrain that may include a power take off is shown. The method of FIGS. 4A-4C may be incorporated into the system of FIGS. 1 and 2 as executable instructions stored in controller non-transitory memory. Further, portions of the method of FIGS. 4A-4C may be actions taken by controller 12 in the physical world to transform vehicle operating states via one or more actuators and/or sensors.

At 402, method 400 determines vehicle conditions. Vehicle conditions may include but are not limited to power take off request status, desired power take off speed, engine speed, engine load, selected transmission gear, and ambient environmental conditions. Method 400 proceeds to 404 after determining vehicle conditions.

At 404, method 400 judges if a user has requested power take off. A user or operator may generate a signal via a human/machine interface and the state of the signal may be interpreted via the controller as a request for PTO output to PTO power consumers or as a request to discontinue PTO output to PTO power consumers. In one example, it may be required that the vehicle be stationary and have a transmission that is engaged in park or neutral to permit PTO activation. Further, method 400 may also require other conditions to be met to determine if the system should provide power take off output. For example, a signal that a PTO output is covered may be required to activate the PTO. If method 400 judges that power take off conditions are met, the answer is yes and method 400 proceeds to 406. Otherwise, the answer is no and method 400 proceeds to 430.

At 430, method 400 judges if driver demand torque or power is less than a threshold level of torque or power. In one example, driver demand torque or power may be determined as a function of a position of a propulsion pedal and vehicle speed. If method 400 judges that driver demand is less than the threshold, the answer is yes and method 400 proceeds to 432. Otherwise, the answer is no and method 400 proceeds to 440.

At 432, method 400 operates the engine in a torque control mode. Output power or torque of the engine is adjusted to meet the driver demand torque or power. The engine output power may be adjusted via a torque actuator such as a throttle, fuel injector, valve timing, or spark timing. Method 400 proceeds to 434.

At 434, method 400 adjusts an actual total number of active cylinders and throttle position responsive to driver demand torque or power and engine speed. In one example, empirically determined values for the actual total number of active cylinders may be stored in a table or function. The values in the tables or functions may be determined via operating the engine on a dynamometer while adjusting the actual total number of active engine cylinders while monitoring engine noise, vibration, and fuel efficiency. The values in the tables or function may be stored according to engine speed and driver demand torque or power. Values in the tables may be retrieved via indexing or referencing the tables via engine speed and driver demand torque or power.

Similarly, open-loop throttle positions may be stored as a function of driver demand torque and engine speed. In addition, the throttle position may be closed loop adjusted to improve throttle position control. Method 400 proceeds to 436.

At 436, method 400 adjusts intake valve lift and phase/timing relative to crankshaft position according to empirically determined valve lift amounts and valve timing values stored in a fourth group of tables or functions. The values in the tables or functions may be determined via operating the engine on a dynamometer while adjusting intake valve lift and timing while monitoring engine noise, vibration, and fuel efficiency. The values in the tables or function may be stored according to engine speed and driver demand torque or power. Values in the tables may be retrieved via indexing or referencing the tables via engine speed and driver demand torque or power. In addition, the valve lift amounts in the fourth group of tables may be different than the valve lift amounts in the first and second groups of tables so that vehicle drivability may be improved. For example, valve lift amounts in the first and second groups of tables may include lower lift values so that the engine may be operated at higher MAP levels since the vehicle may be stationary when the PTO is operating. Stationary vehicle operation may allow the engine to operate at higher MAP levels and with less torque reserve since vehicle drivability may not be an issue in active PTO modes. Method 400 proceeds to exit.

At 440, method 400 operates the engine in a speed control mode. The engine may be operated in speed control mode to control engine idle speed or to control engine speed while speed of a vehicle is being reduced. Method 400 proceeds to 442.

At 442, method 400 adjusts an actual total number of active cylinders and throttle position responsive to driver demand torque or power and engine speed. In one example, empirically determined values for the actual total number of active cylinders may be stored in a table or function. The values in the tables or functions may be determined via operating the engine on a dynamometer while adjusting the actual total number of active engine cylinders while monitoring engine noise, vibration, and fuel efficiency. The values in the tables or function may be stored according to engine speed and driver demand torque or power. Values in the tables may be retrieved via indexing or referencing the tables via engine speed and driver demand torque or power. For example, the actual total number of active cylinders may be equal to the number of all of the engine's cylinders when the engine is idling. The actual total number of active cylinders may be equal to half of the number of all of the engine's cylinders when the vehicle is coasting and engine speed is above idle speed. The throttle opening amount may be controlled to a fully closed position. Method 400 proceeds to 444.

At 444, method 400 adjusts intake valve lift and phase/timing relative to crankshaft position according to empirically determined values stored in a third group of tables or functions. The values in the tables or functions may be determined via operating the engine on a dynamometer while adjusting intake valve lift and timing while monitoring engine noise, vibration, and fuel efficiency. The values in the third group of tables or function may be stored according to engine speed and driver demand torque or power. Values in the tables may be retrieved via indexing or referencing the tables via engine speed and driver demand torque or power. The values that are stored in the third group of tables or functions may be different than the values stored in the fourth group of tables so that smooth engine idle (e.g., lower speed variation) may be provided with a large torque reserve that may improve engine response during conditions where driver demand increases are more significant. Method 400 proceeds to exit.

At 406, method 400 operates the engine in a speed control mode. The engine may be operated at a constant speed that is based on the device that is receiving engine power via the PTO. For example, the engine speed may be adjusted to a speed that causes the output of the PTO to rotate at a speed of 540 RPM. A control routine within controller 12 may control engine speed to a requested or desired speed that is based on PTO driven device criteria. If the PTO load increases causing engine speed to decline from the requested or desired speed, the control routine may demand additional engine torque via adjusting one or more torque actuators. If the PTO load decreases causing engine speed to increase from the requested or desired speed, the control routine may demand less engine torque via adjusting one or more torque actuators. Method 400 proceeds to 408.

At 408, method 400 judges if the engine and PTO are to operate in an "efficient" mode. In one example, method 400 may determine if the PTO is to operate in "efficient" mode according to input received via a human/machine interface and a state of a signal output to a controller from the human/machine interface that reflects user input to the human/machine interface. One state of the signal may be interpreted as a request for "efficient" mode and another state of the signal may be interpreted as a request for "smooth" mode or low noise and vibration mode (e.g., an engine operating mode where engine noise is less than a threshold and engine vibration is less than a threshold). If method 400 judges that the engine is to operate in "efficient"

mode, the answer is yes and method 400 proceeds to 410. Otherwise, the answer is no and method 400 proceeds to 450 and the engine and PTO are operated in a "smooth" or low noise mode.

At 450, method 400 adjusts an actual total number of active cylinders and throttle position responsive to driver demand torque or power and engine speed. In one example, method 400 may reference a table or function that includes a plurality of cells that hold values indicating an actual total number of cylinders to operate in the engine. Cells in the table or function may be referenced via the present engine speed and load. The values in the cells may indicate how many cylinders to activate. In other words, the values in the cells may indicate an actual number of cylinders to operate in the engine. For example, for an eight cylinder engine operating at an engine load of 0.2 and engine speed of 2000 RPM, the table may contain a value of four. The same table may contain a value of eight when the engine operates at engine load of 0.6 and 2000 RPM. Accordingly, the engine may be operated with four active cylinders when the engine is operating at 0.2 load and 2000 RPM. The engine may be operated with eight active cylinders when the engine operates at engine load of 0.6 at 2000 RPM. The engine is commanded to operate with an actual total number of cylinders indicated in one of the table's cells according to the present engine speed and load.

The values in the table or function may be determined via operating the engine on a dynamometer while adjusting the actual total number of active engine cylinders while monitoring engine noise, vibration, and fuel efficiency. The values in the tables or function may be stored according to engine speed and engine load. Values in the tables may be retrieved via indexing or referencing the tables via engine speed and engine load.

Similarly, open-loop throttle positions may be stored as a function of engine speed and engine load. For example, a table or function may include cells or entries that indicate an engine air flow rate for each engine speed and load pair. The engine air flow rate may then be input to a throttle position transfer function and the throttle position transfer function may output a throttle position for providing the engine air flow rate. In addition, the throttle position may be closed loop adjusted to improve throttle position control. Method 400 proceeds to 452.

At 452, method 400 ceases fuel delivery and ramps or gradually decreases intake valve lift of cylinders to be deactivated to zero lift, thereby deactivating cylinders so that the actual total number of activated cylinders is equal to the value included in the table described at 450. Alternatively, method 400 activates fuel delivery and ramps or gradually increases intake valve lift of cylinders to be activated from zero lift, thereby activating cylinders so that the actual total number of activated cylinders is equal to the value included in the table described at 450. The intake valve lift of active cylinders is adjusted according to values stored in a second group of tables. Intake valve lift values stored in the second group of tables provide for low engine noise and vibration. Further, the intake valve lift values stored in the second group of tables may be based on the actual total number of active cylinders determined at 450. For example, intake valve lift values stored in the second group of tables may include valve lift amounts for a particular engine speed and engine load that are greater than intake valve lift amounts stored in the first group of tables mentioned at 412. Consequently, the engine may operate at a lower MAP at the particular engine speed as compared to when the engine is operated at the particular engine speed with intake valve lift amounts that are based on outputs of the first group of tables. The engine rotates the PTO and provides power to PTO power consumers. Method 400 proceeds to exit.

At 410, method 400 adjusts an actual total number of active cylinders and throttle position responsive to driver demand torque or power and engine speed. In one example, method 400 may reference a first table or function that includes a plurality of cells that hold values indicating an actual total number of cylinders to operate in the engine. Cells in the table or function may be referenced via the present engine speed and load. The values in the cells may indicate how many cylinders to activate. In other words, the values in the cells may indicate an actual number of cylinders to operate in the engine. The actual total number of active cylinders that is output by the first table for a particular engine speed and load may be different than the actual total number of active cylinders that is output by a second table as mentioned at 450 so engine efficiency may be increased. For example, at 0.4 load and 2500 RPM the first table may output a value of 6 and the second table mentioned at 450 may output a value of 8 for the same 0.4 load and 2500 RPM condition. The engine is commanded to operate with an actual total number of cylinders indicated in one of the table's cells according to the present engine speed and load.

The values in the table or function may be determined via operating the engine on a dynamometer while adjusting the actual total number of active engine cylinders while monitoring engine noise, vibration, and fuel efficiency. The values in the tables or function may be stored according to engine speed and engine load. Values in the tables may be retrieved via indexing or referencing the tables via engine speed and engine load.

Similarly, open-loop throttle positions may be stored as a function of engine speed and engine load. For example, a table or function may include cells or entries that indicate an engine air flow rate for each engine speed and load pair. The engine air flow rate may then be input to a throttle position transfer function and the throttle position transfer function may output a throttle position for providing the engine air flow rate. In addition, the throttle position may be closed loop adjusted to improve throttle position control. Method 400 proceeds to 412.

At 412, method 400 ceases fuel delivery and ramps or gradually decreases intake valve lift of cylinders to be deactivated to zero lift, thereby deactivating cylinders so that the actual total number of activated cylinders is equal to the value included in the table described at 410. Alternatively, method 400 activates fuel delivery and ramps or gradually increases intake valve lift of cylinders to be activated from zero lift, thereby activating cylinders so that the actual total number of activated cylinders is equal to the value included in the table described at 410. The intake valve lift of active cylinders is adjusted according to values stored in a first group of tables. Intake valve lift values stored in the first group of tables provide for higher engine efficiency as compared to the second group of tables. Further, the intake valve lift values stored in the first group of tables may be based on the actual total number of active cylinders determined at 410. For example, intake valve lift values in the first group of tables may include valve lift amounts for a particular engine speed and engine load that are less than intake valve lift amounts in the second group of tables mentioned at 452. Consequently, the engine may operate at higher MAP values at the particular engine speed as compared to when the engine is operated at the particular engine speed with intake valve lift amounts that are based on outputs of the second group of tables. By operating the engine at higher MAP values, engine pumping losses may be reduced as compared to when the valve lift is controlled according to the valve lift values stored in the second group of tables. The engine rotates the PTO and provides power to PTO power consumers. Method 400 proceeds to exit.

Thus, the method of FIGS. 4A-4C provides for a method for operating an engine, comprising: receiving a user input signal to a controller; operating an engine in a first mode while delivering power from the engine to a device via a transmission power take off in response to a state of the user input signal; and operating an engine in a second mode while delivering power from the engine to the device via the transmission power take off in response to the state of the user input signal. The method includes where the engine operates with greater efficiency in the first mode than in the second mode. The method includes where the engine operates with less noise and vibration in the second mode than in the first mode. The method further comprises deactivating one or more cylinders in the first mode or in the second mode while delivering engine power to the device via the transmission power take off. The method includes where the one or more cylinders are deactivated via a variable valve lift system. The method further comprises operating the engine in a speed control mode in the first and second modes and adjusting lift of one or more intake valves in response to a speed of the engine deviating from a requested engine speed. The method further comprises adjusting an actual total number of active cylinders in response to the speed of the engine deviating from the requested engine speed.

The system of FIGS. 4A-4C provides for a method for operating an engine, comprising: operating an engine in a first mode with a first actual total number of active cylinders and a first valve lift amount while delivering power from the engine to a device via a transmission power take off; and operating an engine in a second mode with a second actual total number of active cylinders and a second valve lift amount while delivering power from the engine to the device via the transmission power take off. The method includes where the first mode is an efficiency improving mode and where the second mode is a noise and vibration reducing mode. The method includes where a user selects between the first mode and the second mode via a human/machine interface. The method includes where the first mode includes fewer active cylinders than the second mode when the engine is operated at a fixed speed and load condition. The method includes where the device is external to a vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A vehicle system, comprising:
an engine including a variable poppet valve lift system;
a transmission coupled to the engine, the transmission including a power take off (PTO) configured to supply power to an off board device;
a controller including executable instructions stored in non-transitory memory that cause the controller to operate the engine with a first poppet valve lift amount at an engine speed and load when the PTO is not delivering power to an external device, and operate the engine with a second poppet valve lift amount at the engine speed and load when the PTO is delivering power to the external device.

2. The vehicle system of claim 1, where the second poppet valve lift amount is less than the first poppet valve lift amount.

3. The vehicle system of claim 2, further comprising additional executable instructions to adjust a position of a throttle valve.

4. The vehicle system of claim 3, where adjusting the position of the throttle valve includes opening the throttle valve further when the engine is operating with the second poppet valve lift amount as compared to a position of the throttle valve when the engine is operating with the first poppet valve lift amount.

5. The vehicle system of claim 1, further comprising deactivating one or more cylinders while the PTO is delivering power to the external device.

6. The vehicle system of claim 5, where deactivating one or more cylinders includes holding at least intake valves or exhaust valves of the one or more cylinders closed for at least one engine cycle.

7. The vehicle system of claim 1, further comprising additional executable instructions for interpreting a user input for selecting between a smooth PTO mode and an efficient PTO mode.

8. The vehicle system of claim 7, where the engine is operated at a higher intake manifold pressure in the efficient PTO as compared to when the engine is operated in the smooth PTO mode.

9. A method for operating an engine, comprising:
receiving a user input signal to a controller;
operating an engine in a first mode while delivering power from the engine to a device via a transmission power take off in response to a state of the user input signal;
operating the engine in a second mode while delivering power from the engine to the device via the transmission power take off in response to the state of the user input signal; and
operating the engine in a speed control mode in the first and second modes and adjusting an actual total number of active cylinders in response to a speed of the engine deviating from a requested engine speed, where a speed of the engine in the speed control mode is based on power take off driven device criteria.

10. The method of claim 9, where the engine operates with greater efficiency in the first mode than in the second mode.

11. The method of claim 10, where the engine operates with less noise and vibration in the second mode than in the first mode.

12. The method of claim 11, further comprising deactivating one or more cylinders in the first mode or in the second mode while delivering engine power to the device via the transmission power take off.

13. The method of claim 12, where the one or more cylinders are deactivated via a variable valve lift system.

14. The method of claim 9, further comprising adjusting lift of one or more intake valves in response to the speed of the engine deviating from the requested engine speed.

15. A method for operating an engine, comprising:
   operating an engine in a first mode with a first actual total number of active cylinders and a first valve lift amount while delivering power from the engine to a device via a transmission power take off; and
   operating the engine in a second mode with a second actual total number of active cylinders and a second valve lift amount while delivering power from the engine to the device via the transmission power take off, where the first mode is an efficiency improving mode and where the second mode is a noise and vibration reducing mode, and where a user selects between the first mode and the second mode via a human/machine interface.

16. The method of claim 15, where the first mode includes fewer active cylinders than the second mode when the engine is operated at a fixed speed and load condition.

17. The method of claim 16, where the device is external to a vehicle.

\* \* \* \* \*